United States Patent
Torres et al.

(10) Patent No.: US 11,562,050 B2
(45) Date of Patent: Jan. 24, 2023

(54) SYSTEM AND METHOD FOR LICENSING AND FOR MEASURING USE OF AN IP BLOCK

(71) Applicants: Centre National de la Recherche Scientifique, Paris (FR); Universite de Montpellier, Montpellier (FR); ALGODONE, Montpellier (FR)

(72) Inventors: Lionel Torres, Combaillaux (FR); Jérôme Rampon, Gallargues le Montueux (FR); Gaël Paul, Aix en Provence (FR)

(73) Assignees: CENTRE NATIONAL DE LA RECHERCHE SCIENTIFIQUE, Paris (FR); Université de Montpellier, Montpellier (FR); ALGODONE, Montpellier (FR)

( * ) Notice: Subject to any disclaimer, the term of this patent is extended or adjusted under 35 U.S.C. 154(b) by 262 days.

(21) Appl. No.: 16/770,547

(22) PCT Filed: Dec. 7, 2018

(86) PCT No.: PCT/FR2018/053153
§ 371 (c)(1),
(2) Date: Jun. 5, 2020

(87) PCT Pub. No.: WO2019/110945
PCT Pub. Date: Jun. 13, 2019

(65) Prior Publication Data
US 2020/0372128 A1 Nov. 26, 2020

(30) Foreign Application Priority Data
Dec. 7, 2017 (FR) .................................. 17/61778

(51) Int. Cl.
*G06F 21/10* (2013.01)
*G06F 21/72* (2013.01)
(Continued)

(52) U.S. Cl.
CPC ............ *G06F 21/105* (2013.01); *G06F 21/72* (2013.01); *G06F 21/73* (2013.01); *G06F 21/76* (2013.01);
(Continued)

(58) Field of Classification Search
None
See application file for complete search history.

(56) References Cited

U.S. PATENT DOCUMENTS 8,670,561 B1 * 3/2014 Langhammer .......... G06F 21/72
380/44
2006/0075374 A1 * 4/2006 McElvain ............... G06F 21/76
716/126
(Continued)

FOREIGN PATENT DOCUMENTS

EP 2911086 A1 8/2015
WO 2017/006058 A1 1/2017

OTHER PUBLICATIONS

Authorized Officer: Sauzon, Guillaume, International Search Report issued in counterpart PCT application No. PCT/FR2018/053153, dated Feb. 5, 2019, 3 pp.
Domenico Amelino et al., "An IP Core Remote Anonymous Activation Protocol", "IEEE Transactions on Emerging Topic in Computing", Nov. 3, 2016, DOI: 10.1109/TETC.2016.2624026, pp. 258-268, vol. 6, No. 2.
(Continued)

*Primary Examiner* — Nelson S. Giddins
(74) *Attorney, Agent, or Firm* — Kaplan Breyer Schwarz, LLP (57) ABSTRACT

An integrated circuit includes: one or more protected circuits; a license control circuit configured to request, from a
(Continued)

license issuer, a license for activating the one or more protected circuits, the license request having a seed value; and a cryptographic circuit configured to verify the authenticity of a license received from the license issuer based on the seed value, wherein the license control circuit is configured to impose a validity limit on the received license, and to request a new license from the license issuer before the validity limit of the received license.

9 Claims, 3 Drawing Sheets

(51) Int. Cl.
    *G06F 21/73*     (2013.01)
    *G06F 21/76*     (2013.01)
    *H04L 9/32*     (2006.01)
(52) U.S. Cl.
    CPC .......... *H04L 9/3242* (2013.01); *H04L 9/3263* (2013.01)

(56) References Cited

U.S. PATENT DOCUMENTS

| 2010/0122353 | A1* | 5/2010 | Koushanfar | G06F 21/10 |
| | | | | 726/33 |
| 2010/0284539 | A1* | 11/2010 | Roy | H03K 19/17768 |
| | | | | 380/278 |
| 2015/0347346 | A1* | 12/2015 | Lee | G06F 11/07 |
| | | | | 710/316 |

OTHER PUBLICATIONS

Lionel Torres et al., "Digital Right Management for IP Protection", Foundation of Hardware IP Protection, Jan. 1, 2017, Springer International Publishing AG, DOI 10.1004/7/978-3-319-50380-6_1, 13 pp., https://link.springer.co/chapter/10.1007/978-3-319-50380-6_1.

Written Opinion dated Feb. 5, 2019 issued in PCT Patent Application No. PCT/FR2018/053153.

* cited by examiner

SYSTEM AND METHOD FOR LICENSING AND FOR MEASURING USE OF AN IP BLOCK

The present patent application claims priority from the French patent application FR17/61778, the contents of which is hereby incorporated by reference.

FIELD

The present disclosure relates to the field of integrated circuits and in particular to a method and system allowing the authentication and licensing of IP (intellectual property) blocks within an integrated circuit, or more generally the authentication and licensing of any circuit or system. The present disclosure also relates to methods and systems for metering the use of IP blocks.

BACKGROUND

Integrated circuits generally comprise a collection of circuit blocks known in the field as IP (intellectual property) blocks. IP blocks correspond to discrete hardware circuit designs that perform specific functions and may be reused in various different integrated circuits. The IP blocks in a given integrated circuit (IC) are generally licensed to the IC designer by the IP rights holders of the IP blocks.

IP blocks are generally delivered to the IC designer as software, for example in a hardware description language such as RTL (Register Transfer Level), Verilog or VHDL (Very high speed integrated circuit Hardware Description Language). The IP rights holder often grants a license to the IC designer to use their IP block in a limited number of integrated circuits and/or a limited number of projects, or requests a royalty payment for each integrated circuit/project that incorporates the IP block.

For some applications, it would be desirable to provide licensing of IP blocks and/or hardware circuits for limited durations. However, existing solutions tend to be complex, costly and/or not sufficiently secure.

SUMMARY

It is an aim of embodiments of the present description to at least partially address one or more problems in the prior art.

According to one aspect, there is provided an integrated circuit comprising: one or more protected circuits; a license control circuit configured to request, from a license issuer, a license for activating the one or more protected circuits, the license request comprising a seed value; and a cryptographic circuit configured to verify the authenticity of a license received from the license issuer based on the seed value, wherein the license control circuit is configured to impose a validity limit on the received license, and to request a new license from the license issuer before the validity limit of the received license.

According to one embodiment, the integrated circuit further comprises a seed memory configured to store one or more of the seed values.

According to one embodiment, the license control circuit is configured to delete from the seed memory seed values associated with non-valid licenses.

According to one embodiment, the received license comprises a message authentication code and the cryptographic circuit is configured to verify the authenticity of the licence by verifying the message authentication code using the seed value stored in the seed memory.

According to one embodiment, the integrated circuit further comprises a random value generator adapted to generate a random or pseudo-random value, the license control circuit being configured to generate the seed value based on the random or pseudo-random value.

According to one embodiment, the seed value comprises a device identifier identifying the integrated circuit.

According to one embodiment, the license comprises a verification code, the integrated circuit further comprising a circuit activation module adapted to activate a first of the one or more protected circuits by loading an activation code into an activation register associated with the first protected circuit based on a verification of the verification code.

According to one embodiment, the cryptographic circuit is further adapted to: derive a device key from the seed value; and decrypt the received license using the device key in order to extract the verification code.

According to one embodiment, the integrated circuit further comprises a metering data generator configured to receive one or more count values relating to the activity of the one or more protected circuits, and to generate metering data based on said one or more count values.

According to one embodiment, the licence control circuit is further configured to: include the metering data in the request for a new license from the license issuer; and/or determine the validity limit of a received license based on the metering data.

According to one aspect, there is provided a method of applying a license to one or more protected circuits of an integrated circuit, the method comprising: requesting, from a license issuer, a license for activating the one or more protected circuits, the license request comprising a seed value; verifying the authenticity of a license received from the license issuer based on the seed value; and imposing a validity limit on the received license and requesting a new license from the license issuer before the validity limit of the received license.

BRIEF DESCRIPTION OF THE DRAWINGS

The foregoing and other features and advantages will become apparent from the following detailed description of embodiments, given by way of illustration and not limitation with reference to the accompanying drawings, in which.

DETAILED DESCRIPTION

While throughout the following description certain embodiments are described as being implemented in hardware, it will be apparent to those skilled in the art that the various embodiments could be at least partially implemented by software instructions executed by one or more processors.

Throughout the following description, the following terms will be given the following definitions:

IP block—a discrete hardware circuit design that performs specific functions and may be reused in various different integrated circuits including FPGAs (field programmable gate arrays);

protected circuit—a circuit, which may correspond to an IP block, to a collection of IP blocks, or to a system comprising one or more integrated circuits, protected by a mechanism such that it is in a deactivated state unless activated by an activation code; and random or pseudo-random value—any digital value that is unpredictable or difficult to predict.

Figure 1:
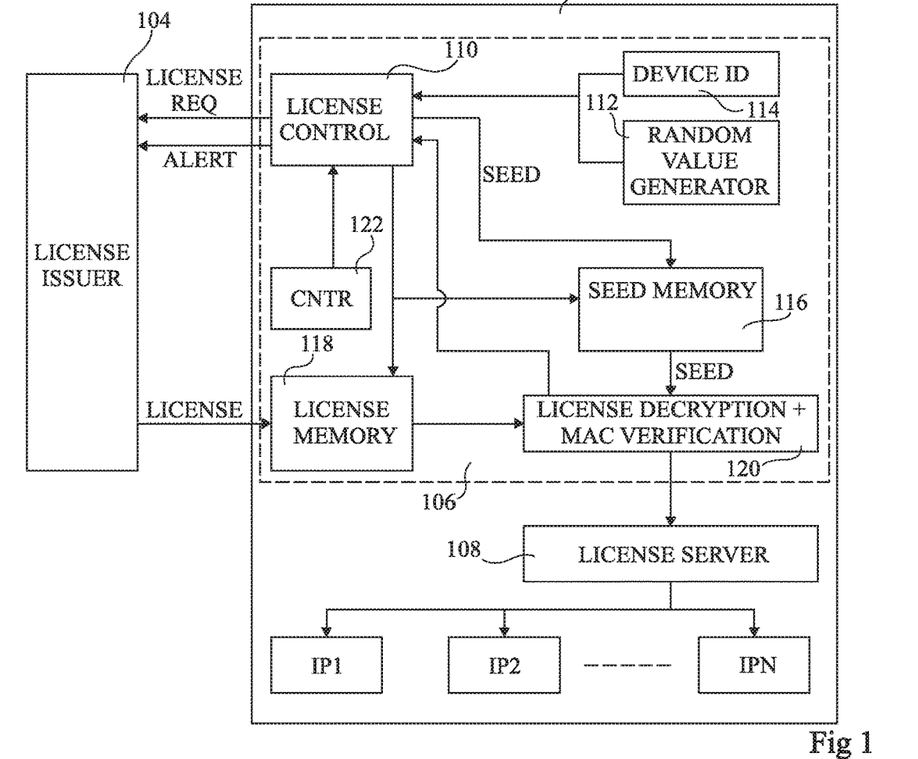
FIG. 1 schematically illustrates an electronic device in communication with a license issuer according to an example embodiment of the present disclosure.

FIG. 1 schematically illustrates an electronic device 102 in communication with a license issuer (LICENSE ISSUER) 104. For example, the communication is via a local network. Alternatively, in some embodiments the license issuer 104 and the device 102 could be separated by a larger network such as the internet.

The electronic device 102 for example comprises protected circuits IP1 to IPN. Each protected circuit is for example a complex circuit developed to perform a precise function, such as for example an image processor capable of performing image processing operations, an interface for managing standard protocols, or other circuit capable of performing advanced operations, such as a processor, an encoding or decoding circuit, etc. In some embodiments, each protected circuit may comprise an FPGA, the functions implemented by the protected circuit being programmed to the FPGA by a programming code.

The device 102 is for example an integrated circuit, and the protected circuits are IP blocks of the integrated circuit. However, in alternative embodiments, the device 102 could correspond to any electronics device, and the protected circuits could each comprise a board or system having more than one integrated circuit. In some embodiments, the device 102 forms part of a product such as mobile telephone, tablet computer, laptop computer, games console or the like, or could be a chip mounted on an integrated circuit card, including the family of cards known as smart cards, such as payment cards, SIM (subscriber identity module) cards or the like.

In other embodiments, the device 102 may form part of a bank of similar hardware devices providing data processing resources that are available for use under license. For example, in the case that the device 102 comprises an FPGA, the end user may purchase licenses enabling the use of the FPGA of the device 102 and/or the use of one or more protected IP circuits that can be programmed onto the FPGA.

The license issuer 104 is for example in communication with the device 102, and performs the role of generating and providing licenses to the device 102 that authorize the continued operation of the hardware and/or of one or more of the protected circuits. For example, each license has a limited period of validity. In some embodiments, each license can be considered as a token that authorizes the operation of the device 102 and/or of one or more of the protected circuits for a given duration. Each license may for example provide authorization for a given time unit, such as a few seconds or minutes, or for a given number of processor clock cycles or operations. Alternatively, the duration of each license may be variable, and its duration may be indicated in the license itself. For example, the license may indicate its duration of validity, expressed for example in seconds or minutes, or as the number of processor clock cycles or operations that it authorizes before becoming invalid.

The device 102 for example comprises a licence management circuit 106, which generates requests for licenses from the license issuer 104, receives and verifies licenses issued by the license issuer 104, and asserts an alert signal ALERT to the license issuer 104 and/or to another entity in the case that there is no valid license present on the device 102. In some embodiments, the alert signal may comprise multiple signals.

In some embodiments described in more detail below, the device 102 also comprises a license server (LICENSE SERVER) 108, which distributes received licenses to the protected circuits IP1 to IPN in order to activate them.

The license management circuit 106 for example comprises a licence control circuit 110, which for example receives a random value from a random or pseudo-random value generator (RANDOM VALUE GENERATOR) 112, and optionally a device identifier (DEVICE ID) 114, and generates a seed value (SEED). This seed value is for example included in a license request message (LICENSE REQ) generated by the license control circuit 110 and transmitted to the license issuer 104. The license control circuit 110 also for example stores the seed value to a seed memory (SEED MEMORY) 116.

The license management circuit 106 receives licenses (LICENSE) issued by the license issuer 104, and for example stores them in a license memory (LICENSE MEMORY) 118. In some embodiments where the licenses are transmitted over a network such as the internet, the licenses are encrypted. Furthermore, each license for example includes an authentication code, such as a MAC (message authentication code), that has been generated by the license issuer 104 using the seed value included in the license request message.

Licenses received by the license management circuit 106 are for example provided to a license decryption and MAC verification circuit (LICENSE DECRYPTION+MAC VERIFICATION) 120, which for example decrypts the license in the case that it has been encrypted, and authenticates the license based on its authentication code and using the corresponding seed value from the seed memory 116.

In the case that the seed value used to generate the authentication code by the license issuer 104 matches the seed value stored to the seed memory 116, the license will be successfully authenticated. However, in case of a mismatch between these seed values, the authentication will fail. In either case, the circuit 120 for example informs the license control circuit 110 of the result of the authentication.

The license management circuit 106 also for example comprises a counter (CNTR) 122 that indicates when a new license should be requested. For example, a new license is requested a certain time period before a current license has expired in order to allow time for the new license to be issued before the expiry of the current license. In some embodiments, the counter 122 counts periods of a clock signal or the like, such that the count signal can be used to determine when it is time to request a new license. Alternatively, the counter 122 may count processing cycles of a processor of one or more of the protected circuits IP1 to IPN, or the number of operations performed by one or more of the protected circuits IP1 to IPN.

In the case that the counter 122 indicates that a current license has expired without a new license having been received, or in the case of an authentication failure of received license indicated by the circuit 120, the alert signal ALERT is for example asserted to inform the license issuer 104, and/or another entity, of the lack of a valid license. For example, a user of the protected circuits IP1 to IPN may be informed by the alert signal that the license has expired, and that one or more of the protected circuits will be deactivated in the absence of a payment for a new license by a certain deadline.

Additionally or alternatively, in the absence of a valid license, one or more of the protected circuits are reset and/or deactivated. For example, following manufacture, or following a reset, one or more of the protected circuits is in a deactivated state, and can only be activated by a verification code. This verification code is for example provided with one or more of the licenses issued by the license issuer 104. Following a reset operation, a license containing the verification code is for example used to reactivate the protected circuits, whereas in the case that there is no valid license, the protected circuits for example remain deactivated.

The seed value is for example a simple concatenation of the random or pseudo-random value generated by the generator 112 with the device identifier. The device identifier is for example a string of bits that identifies the device 102 or a group of devices 102, and which serves for authentication. The license that is provided by the license issuer 104 can for example only be used for a device having that identifier, and in some embodiments, the device identifier is unique for each device, such that a given license can only ever activate the protected circuits of one device 102. The device identifier is for example based on the generation of a signature that is unique to the device 102. Therefore, even if two integrated circuits are fabricated and/or programmed to have identical functionality, their signatures and thus their device identifiers will be different.

The device identifier is for example generated by or derived from a PUF (Physically Unclonable Function). The PUF value is for example generated by a CPU (Central Processing Unit) of the device 102, and/or based on one or more ring oscillators mounted on the device 102. The generation of a PUF value is described in more detail in the International Patent Application published as WO2017/006058. As an alternative to a PUF, another form of device identifier could be used, such as an identifier assigned to the device by the device manufacturer.

Figure 2:
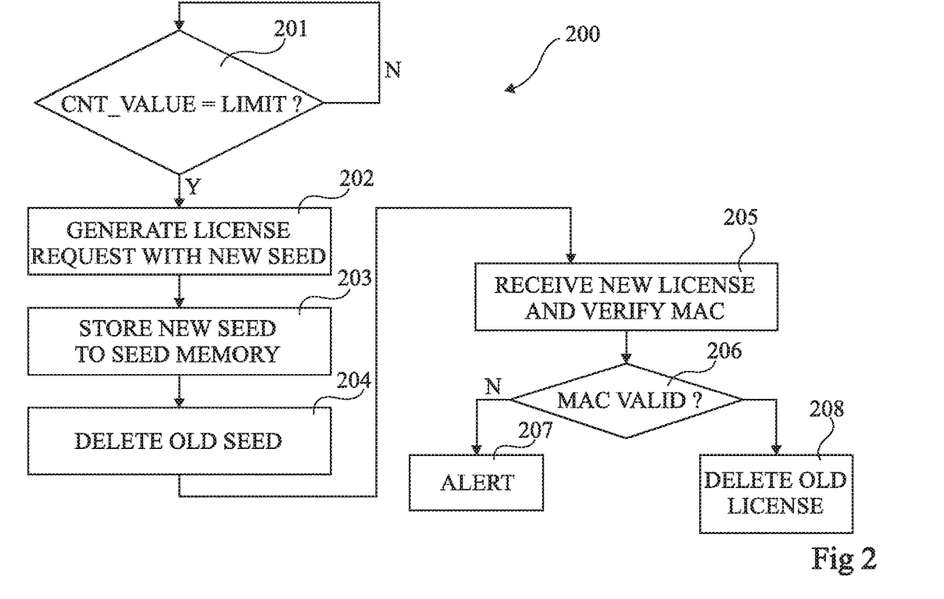
FIG. 2 is a flow diagram illustrating operations in a method of protecting one or more circuits of an integrated circuit according to an example embodiment of the present disclosure.

FIG. 2 is a flow diagram representing operations in a method 200 of applying a license to one or more protected circuits according to an example embodiment, this method for example being implemented by the license management circuit 102 of FIG. 1.

In an operation 201, it is verified when the count value CNT_VALUE generated by the counter 122 of FIG. 1 has reached a limit. Once this count value reaches the limit, the method goes to an operation 202.

In operation 202, a license request message is generated by the license control circuit 110 based on a new seed value provided by the random value generator 112 and optionally based on the device identifier 114. This license request message is transmitted to the license issuer 104.

In an operation 203, the new seed value transmitted in the license request is also stored by the license control circuit 110 to the seed memory 116.

In an operation 204, an old seed from the seed memory is for example deleted. For example, in some cases the license control circuit 110 maintains in the seed memory one or more current seed values associated with one or more currently valid licenses, and one or more new seed values associated with one or more license requests, whereas other seed values are deleted to render old licenses invalid.

In an operation 205, a new license is received in response to the license request generated in operation 202. This license is provided to the license decryption and MAC verification circuit 120, which decrypts the license if encrypted, and verifies the MAC transmitted in the license.

In an operation 206, it is then for example determined whether or not the MAC is valid. If not, an alert signal is for example generated by the license control circuit 110 in an operation 207. If however the license is valid, in an operation 208, the license control circuit 110 for example deletes the old license from the license memory 118. Furthermore, in the case that the license contains information regarding its validity period, this information is for example provided by the license decryption and MAC verification circuit 120 to the license control circuit 110, which uses this information to determine the count limit for requesting a subsequent license.

Figure 3A:
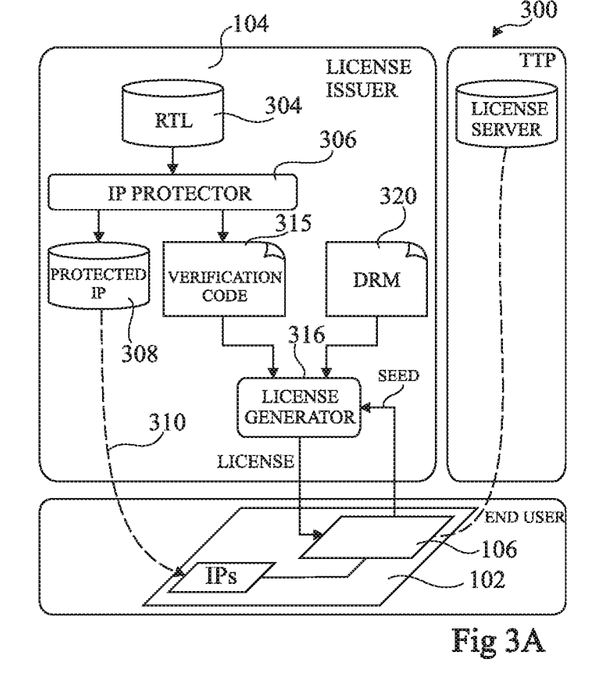
FIG. 3A schematically illustrates a system permitting IP block licensing according to an example embodiment of the present disclosure.

FIG. 3A schematically illustrates a system 300 permitting authentication and licensing of protected circuits according to an example embodiment of the present disclosure. Some features of the system 300 are similar to features of the system 100 of FIG. 1, and such features have been labelled with like reference numerals, and will not be described again in detail.

In the system 300, some or all of the licenses generated by the license issuer 104 include a verification code for activating protected circuits of the device 102, as will now be described.

The system 300 includes hardware associated with three main parties, the license issuer (LICENSE ISSUER) 104, a trusted third party (TTP) and an end user (END USER). In some embodiments, the license issuer 104 may be the IP vendor, or may be in communication with one or more IP vendors. The protection is for example based on a unitary activation of one or more protected circuits.

The end user may have purchased the device 102. Alternatively, the end user may be licensing the use of the device 102, for example via an intermediate party.

According to the embodiments described herein, the one or more IP blocks (IPs) on the device 102, corresponding to the devices IP1 to IPN of FIG. 1, are for example initially in a deactivated state before any valid license has been received. The end user activates the deactivated IP blocks by requesting a license from the license issuer or from the TTP. However, in alternative embodiments, rather than the end user, the activation may be performed by another party in the supply chain, such as the integrated circuit designer, or a vendor of a product containing the device 102.

Some of the protected circuits may be activated permanently by an initial license, or remain activated until a subsequent reset of the device 102. Indeed, the particular activation type (permanent, until next reset, for a limited period) may be different for each protected circuit of the device. Furthermore, while the method described herein can be used to activate a single IP block, it can also be applied more generally to the activation of any protected circuit, which may correspond to all IP blocks of a given device, to an IP block within another IP block and/or to an IP block comprising another IP block, to a system or IC card, to the activation of all circuits in a design using a given ASIC (Application Specific Integrated Circuit) technology, to the activation of a given family of FPGA, to the activation of FPGA's produced by a given manufacturer, etc. It could also be applied at the system level. Furthermore, in some embodiments, the license can be used to activate or deactivate only a sub-set of the functions of an IP block.

An example of the process for protecting and activating an IP block will now be described in more detail.

At the license issuer 104, a database (RTL) 304 for example stores one or more IP blocks represented in a hardware description language such as plain RTL (Register Transfer Level) code.

An IP protector block (IP PROTECTOR) 306 for example comprises software for executing an IP protection function, which is used to modify one or more of the IP blocks from the database 304 to render the circuit inactive. In particular, the IP block is altered such that an activation code is required to unlock its functionalities. In some embodiments, this step can be performed entirely automatically, while in other embodiments it could be performed at least partially manually, for example by a designer of the IP block. As will be described in more detail below, the modification of the IP block for example involves inserting, into the hardware description file, one or more logic gates into one or more signal paths of the IP block. These logic gates for example permit the propagation of the unaltered signal along the signal path only if one or more correct activation bits are provided at one or more input nodes of the inserted logic gates. In some embodiments, the activation code may be unique to a given IP design. In other embodiments, the same activation code may be used for more than one IP design. Furthermore, in some embodiments, there may be more than one activation code that can activate an IP block. This may for example facilitate the license generation operation.

A circuit for managing the IP license, which will be referred to herein as a license client (not illustrated in FIG. 3A) is for example added to each IP block to be protected. As will be described in more detail below, the license client for example comprises a register for storing the activation code once a valid license has been supplied. In some embodiments, the license client is integrated within each IP block, although as described in more detail below, each license client could also be external to the corresponding IP block.

In some embodiments, the files representing the modified IP blocks are for example also protected by encryption.

The activation codes, and optionally part or all of the modified IP blocks, are for example stored in a database (PROTECTED IP) 308 of the license issuer. For example, the task of generating licenses including activation codes has been delegated by one or more IP vendors to the license issuer 104. The modified IP blocks are also delivered to a designer of device 102 such that, as represented by an arrow 310 in FIG. 3A, one or more protected IP blocks are implemented in hardware in the device 102. In particular, the integrated circuit designer for example brings together various different IP blocks to form an integrated circuit, and one or more of these IP blocks for example correspond to IP blocks protected by an activation code as described herein. Alternatively, the modified IP blocks are programmed to an FPGA of the device 102.

Some or all of the licenses provided to the device 102 for example comprise a verification code. The term "verification code" is used herein to designate a code that is communicated with the license and permits one or more IP blocks to be activated. This code may be the activation code for one or more IP blocks. In alternative embodiments, the activation code is already stored in a protected memory, for example a ROM, of the IP block, and the activation code is not included in the license. In this case the verification code is a secret code communicated with the license to the IP block which permits the activation code to be loaded from the protected memory to the activation code register. In some embodiments, a temporary license may be provided to the integrated circuit designer for circuit conception/testing purposes.

As described in relation to FIG. 1, the device 102 for example comprises a licence management circuit 106 coupled to the protected circuits.

When the device 102 is activated for a first time after fabrication and/or programming, the value of the device identifier is for example read by reading a value generated by a PUF circuit or the like. In some cases, the PUF value may change over time due to aging of the integrated circuit, and/or due to other reasons such as the environment (temperature, voltage, etc.). In some embodiments, in view of a potential change in the PUF, at least part of the generated PUF value is stored to a non-volatile memory, and/or error correction code is generated, allowing the PUF value to be corrected if certain bits of the PUF value stray from their original value. The device identifier is also made available at a port of the device 102, or otherwise communicated outside of the device 102, and is for example used to request some or all of the licenses for activating the protected IP blocks.

In some embodiments, a separate license is generated for each IP block to be activated. Alternatively, a license may be generated for activating a plurality of IP blocks. The verification code or codes (VERIFICATION CODE) 315 for unlocking the protected IP block or blocks of the device 102 is/are for example provided to a license generator (LICENSE GENERATOR) 316 of the license issuer 104. The license generator 316 is used to generate a license (LICENSE), which is for example transmitted to the license management circuit 106 of the device 102. The license generator 316 for example receives the seed value from the device 102, and generates the license based on this seed value and on the verification code or codes.

In some embodiments, the license also incorporates DRM (Design Right Management) data 320. The DRM data for example indicates a particular limit on the duration of activation of an IP block. For example, it may indicate that the license for a particular protected circuit is valid for a certain duration, such as a period of a few seconds or minutes. It may also indicate a limitation of the license to one or more hardware types, such as a technology of ASIC, FPGA family, or specific features of an IP block that are to be unlocked. The hardware type of the circuit can for example be determined by a specific sensor, and compared to the one or more authorized hardware types in order to limit the use of the IP block to these hardware types. Furthermore, additionally or alternatively, the DRM data of the license may define limitation data indicating limits of the license based on other variables that can be measured by sensors of the device.

The DRM data may for example be verified and applied only once, upon initial activation of one or more of the IP circuits based on the verification code. Alternatively, DRM data could be verified and applied each time a new license comprising DRM data is received from the license issuer 104.

In some embodiments, the DRM data modifies the verification code. For example, in some embodiments, the verification code comprises the activation code, and some bits of the activation code are not provided or incorrect such that only part of the IP block is activated by the activation code. In other embodiments, other techniques could be used, which are not based on a bit by bit activation/deactivation of the IP block.

Figure 3B:
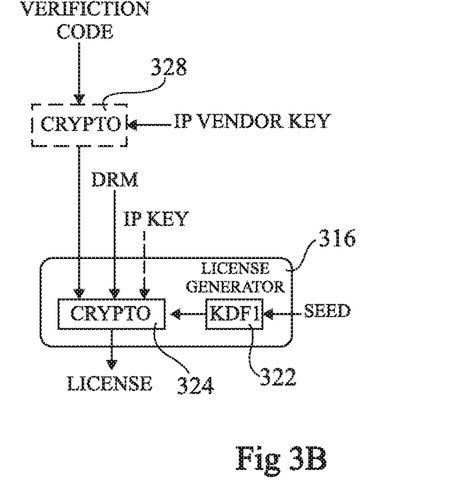
FIG. 3B illustrates a license generation circuit of FIG. 3A in more detail according to an example embodiment.

FIG. 3B illustrates the license generator 316 in more detail according to an example embodiment. The license generator 316 for example includes a key derivation function (KDF1) block 322, which generates a device key based on the seed value (SEED) provided by the device 102. The license generator 316 also for example comprises a cryptographic circuit (CRYPTO) 324, which applies the device key to the verification code or codes of the IP blocks to be activated, in order to generate the license. For example, the cryptographic circuit 324 encodes the verification code(s) based on the device key by applying an encryption algorithm such as DES (Data Encryption Standard), AES (Advance Encryption Standard) or the like. The DRM data may also be encrypted and form part of the license.

As represented by a block 328 (CRYPTO), in some embodiments, the verification code(s) may be encrypted, by the IP vendor, using an IP vendor key (IP VENDOR KEY), and the IP vendor key is also for example stored by the IP vendor within the IP block, permitting the verification code(s) to be decrypted. In this way, even the license issuer 104 cannot access the verification codes.

The generated license is then provided to the device 102. In some embodiments, a symmetrical encryption/decryption algorithm is used to encrypt the license by the license generator 316 using the device key, and then to decrypt the license at the device 102, such that if the keys are identical, the verification code will be successfully recuperated.

Figure 4:
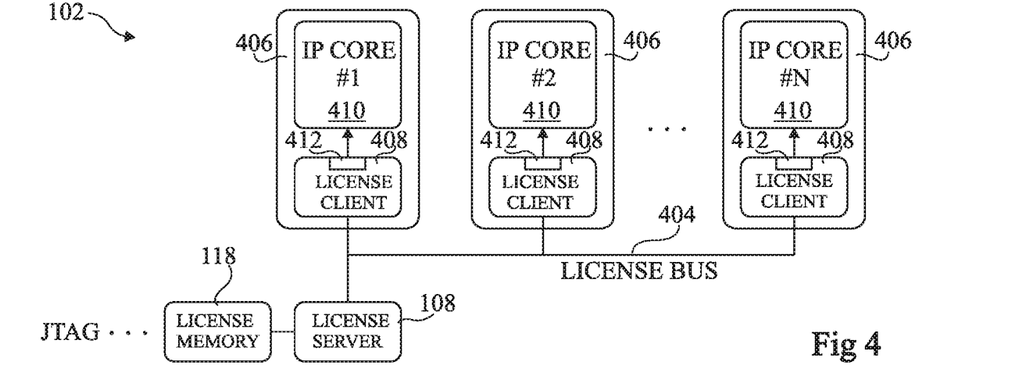
FIG. 4 schematically illustrates an electronic device comprising IP licensing components according to an example embodiment of the present disclosure.

FIG. 4 schematically illustrates licensing components of the device 102 of FIG. 3A in more detail according to an example embodiment, in the case that the communication between the license server 108 and the IPs is based on a client server configuration. However, in alternative embodiments, other types of communication configurations would be possible, such as a network on chip (NoC), or a multicast or broadcast protocol. Communication between the license server 108 and the IPs is for example rendered secure using encryption. Example implementations of the communication interface between the license server 108 and the IPs is for example described in more detail in International Patent Application published as WO2017/006058.

As illustrated in FIG. 4, a JTAG (Joined Test Action Group) interface is for example used for transmitting the license received from the license generator 316 to a license memory (LICENSE MEMORY) 108 of the device 102. Of course, it would be possible to use other interface standards, such as USB (universal serial bus). The memory 118 is for example a RAM (Random Access Memory). The license memory 118 is for example internally coupled to the license server 108. The license server 108 for example communicates, via a license bus (LICENSE BUS) 404, with the protected IP blocks 406. In the example of FIG. 4, the license bus 404 is coupled to a license client circuit (LICENSE CLIENT) 408 associated with each IP block 406, which is in turn coupled to the rest of the IP block 406, labelled as IP cores (IP CORE) 410 in FIG. 4. In the example of FIG. 4, there are N IP cores 1 to N, where N is for example equal to an integer of 2 or more.

The license client 408 of each IP block 406 for example verifies the license, and based on this verification, provides the activation code to the corresponding IP core in order to activate its functionalities. For example, each license client 408 comprises an activation code register 412 into which the activation code is loaded if the license is found to be valid. The register 412 of each license client is coupled to the corresponding IP core 410 in order to activate its functionalities.

Figure 5A:
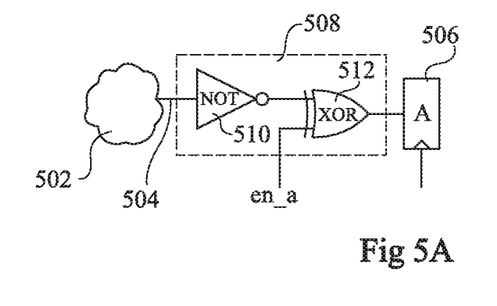
FIGS. 5A and 5B schematically illustrate activation circuits of an IP block according to an example embodiment of the present disclosure.
Figure 5B:
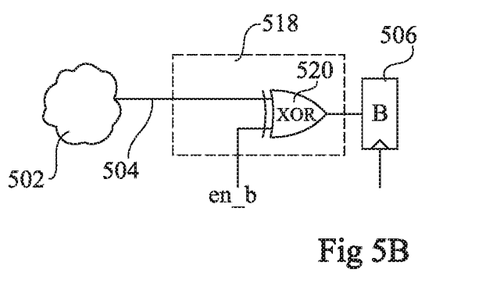

FIGS. 5A and 5B illustrate examples of circuits used for rending the activation of IP blocks dependent on one or more bits of an activation code, by inserting logic gates into a signal path of the IP block.

In the example of FIG. 5A, a circuit portion of the IP block represented by cloud 502 provides an output signal on a line 504, which is coupled to the input of a synchronous logic device (A) 506. To render the activation of the output line 504 dependent on an activation bit, an activation circuit 508 is inserted between the output line 504 and the input of the synchronous device 506. The circuit 508 for example comprises an inverter (NOT) 510 having its input coupled to the line 504, and its output coupled to one input of an exclusive OR (XOR) gate 512. The other input of the exclusive OR gate 512 receives an activation bit en_a, which should be high in order to permit the data signal present on the line 504 to propagate to the synchronous device 506.

FIG. 5B illustrates another example of an activation circuit 518 inserted in the same signal path as in the example of FIG. 5A. However, the circuit 518 comprises an exclusive OR (XOR) gate 520 having one input coupled to the line 504, and its other input coupled to receive an activation bit en_b. In this example, the activation bit should be low in order to permit the signal on line 504 to be propagated to the input of the synchronous device (B) 506.

Thus FIGS. 5A and 5B illustrate examples of circuits that can be inserted in order to activate circuit portions of the IP blocks based on high and low activation bits respectively. Similar circuits may be inserted at various points within the IP block, such that the IP block will not function without the correct activation code. Of course, FIGS. 5A and 5B merely provide some examples of the logic gates that can be used to protect the IP block, and many different logic functions could be implemented based on the same principles. In some embodiments, the insertion is performed randomly, such that the activation code is a random value, and does not depend on the function of the underlying circuit. In alternative embodiments, the insertion could be non-random. Furthermore, while in the examples of FIGS. 5A and 5B the circuit 508 is used in the case of activation by a "1" bit of the activation code, and the circuit 518 is used in the case of activation by a "0" bit of the activation code, in alternative embodiments there are multiple different circuits that are used in the case of "1" and "0" bit activation, and the selection among these is circuits is random.

In some embodiments, the license management circuit 106 of FIG. 1 is further configured to implement a metering method, as will now be described in more detail with reference to FIGS. 6 and 7.

Figure 6:
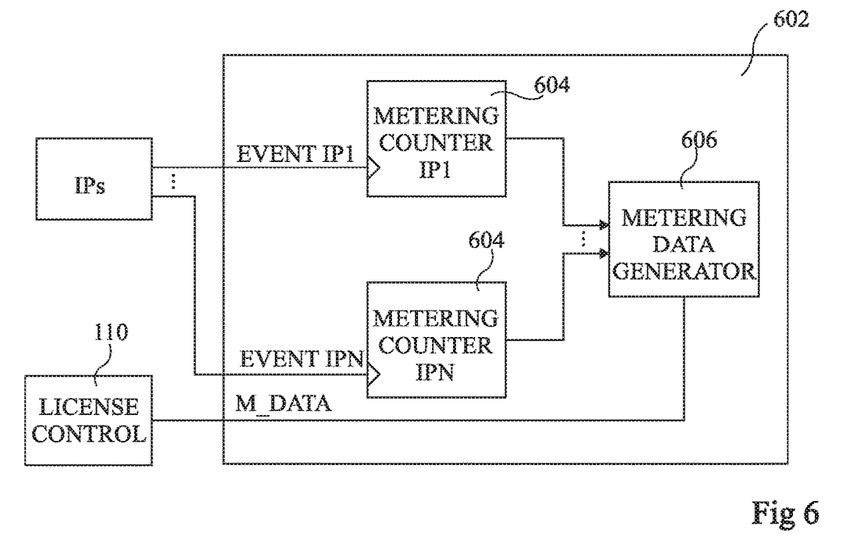
FIG. 6 schematically illustrates a metering circuit according to an example embodiment of the present disclosure.

FIG. 6 schematically illustrates a metering circuit 602 according to an example embodiment of the present disclosure. The circuit 602 is for example implemented on the device 102 in order to periodically provide metering data to the license issuer 104. Metering data for example corresponds to data concerning the activity of one or more of the protected circuits (IPs). In the example of FIG. 6, the circuit 602 comprises N metering counters (METERING COUNTER IP1, METERING COUNTER IPN) 604, which respectively receive event signals EVENT IP1 to EVENT IPN from the corresponding protected circuits IP1 to IPN. For example, the event signals indicate when an event occurs relating to the activity of the circuit. For example, an event could correspond to one or more image processing operations, the processing of one or more packets, the execution of one or more instructions, etc.

The count values generated by the metering counters 604 are for example provided to a metering data generator 606, which uses the metering data to periodically generate metering data M_DATA. For example, the metering data corresponds to a tally of the events counted by each of the counters 604 during a given time interval.

The metering data M_DATA is for example provided to the license control circuit 110 of the license management circuit 106 of FIG. 1, and new metering data is for example generated and incorporated into each license request message. In some embodiments, the metering data can be used to determine the period of validity of each license, instead of or in addition to the counter 122. Alternatively, the metering data could be transmitted independently of the license requests.

Figure 7:
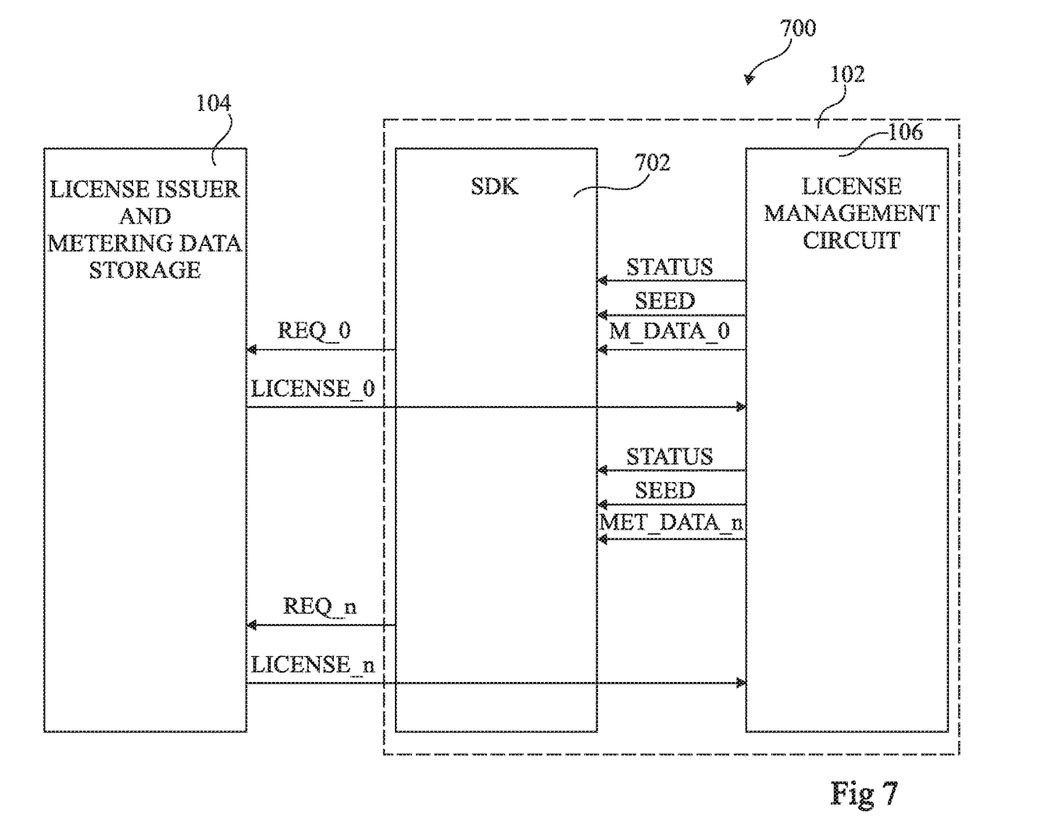
FIG. 7 schematically illustrates a licensing system according to a further example embodiment of the present disclosure.

FIG. 7 schematically illustrates a device licensing and metering system 700 according to an example embodiment of the present disclosure. Features in FIG. 7 which are similar to features of FIG. 1 have been labelled with like reference numerals and will not be described again in detail.

In the system of FIG. 7, the device 102 comprises the license management circuit 106 and a software design kit (SDK) 702. The SDK 702 for example provides a software layer for controlling communications between the circuit 106 and the license issuer 104. The license management circuit 106 for example generates periodic license request messages, each comprising a status signal (STATUS), the seed value (SEED) and metering data M_DATA. The status signal for example reports whether license loading has been loaded successfully. This signal may be a single bit, or could encode more complex status information using more than one bit. The SDK 702 in turn forwards the license request messages to the license issuer 104, which in this example includes metering data storage (LICENSE ISSUER AND METERING DATA STORAGE). The issuer 104 extracts the metering data, which can for example be used for billing purposes, and returns the requested license, which is forwarded by the SDK 702 to the license management circuit 106.

In some embodiments, each license request further indicates a user identifier and/or session identifier associated with the use of the device 102, allowing for example a user account to be associated with the metering data and or license request.

An advantage of the embodiments described herein is that license protection, based on licenses having limited periods of validity, can be applied to circuits of a device in a simple manner based on seed values generated by the device. Indeed, the seed values permit a verification that each license has been generated based on the corresponding seed value stored on the device, and licenses can be invalidated after their expiry limit by removing the corresponding seed values.

Having thus described at least one illustrative embodiment, various alterations, modifications and improvements will readily occur to those skilled in the art. For example, it will be apparent to those skilled in the art that while a particular example of a license management circuit has been described in relation with FIG. 1, many variations could be applied. Furthermore, rather than this circuit being implemented on the device 102, it could be implemented in a separate device in communication with the device 102.

Furthermore, while counters have been described in the various embodiments that count up, it will be apparent to those skilled in the art that one or more of the counters could alternatively decrease. For example, the counter 122 could be initiated at a count value based on the validity period of a license, and the license renewal or expiry could be triggered when this counter reaches zero.

Furthermore, it will be apparent to those skilled in the art that the various features described in relation to the various embodiments could be combined, in alternative embodiments, in any combination.

The invention claimed is:

1. An integrated circuit comprising:
one or more protected circuits;
a license control circuit configured to request, from a license issuer, a license for activating the one or more protected circuits, the license request comprising a first seed value;
a seed memory configured to store the first seed value; and
a cryptographic circuit configured to verify the authenticity of a license received from the license issuer based on the first seed value, wherein the license control circuit is configured:
to receive the license;
to impose a validity limit on the received license, and to request a new license from the license issuer before the validity limit of the received license, the new license request comprising a new seed value;
to store the new seed value to the seed memory; and
to delete from the seed memory the first seed value after the validity limit of the received license.

2. The integrated circuit of claim 1, wherein the received license comprises a message authentication code and wherein the cryptographic circuit is configured to verify the authenticity of the license by verifying the message authentication code using the first seed value stored in the seed memory.

3. The integrated circuit of claim 1, further comprising a random value generator adapted to generate a random or pseudo-random value, wherein the license control circuit is configured to generate the first seed value based on the random or pseudo-random value.

4. The integrated circuit of claim 1, wherein the first seed value comprises a device identifier identifying the integrated circuit.

5. The integrated circuit of claim 1, wherein the license comprises a verification code, the integrated circuit further comprising a circuit activation module adapted to activate a first of the one or more protected circuits by loading an activation code into an activation register associated with the first protected circuit based on a verification of the verification code.

6. The integrated circuit of claim 5, wherein the cryptographic circuit is further adapted to:
derive a device key from the first seed value; and
decrypt the received license using the device key in order to extract the verification code.

7. The integrated circuit of claim 1, further comprising a metering data generator configured to receive one or more count values relating to the activity of the one or more protected circuits, and to generate metering data based on said one or more count values.

8. The integrated circuit of claim 7, wherein the license control circuit is further configured to:
include the metering data in the request for a new license from the license issuer; and/or determine the validity limit of a received license based on the metering data.

9. A method of applying a license to one or more protected circuits of an integrated circuit, the method comprising:

requesting, by a license control circuit of the integrated circuit from a license issuer, a license for activating the one or more protected circuits, the license request comprising a first seed value;

storing the first seed value in a seed memory;

receiving, by the license control circuit, the license;

verifying the authenticity of a license received from the license issuer based on the first seed value;

imposing a validity limit on the received license and requesting a new license from the license issuer before the validity limit of the received license, the new license request comprising a new seed value; and deleting from the seed memory the first seed value after the validity limit of the received license.

* * * * *